United States Patent [19]

de Graaf

[11] 4,221,839
[45] Sep. 9, 1980

[54] METHOD FOR PROTECTING SURFACES AGAINST FOULING BY MARINE ORGANISMS

[75] Inventor: Aart P. de Graaf, Goes, Netherlands

[73] Assignee: M&T Chemicals Inc., Woodbridge, N.J.

[21] Appl. No.: 889,146

[22] Filed: Mar. 23, 1978

[30] Foreign Application Priority Data

Mar. 28, 1977 [NL] Netherlands ................. 7703305

[51] Int. Cl.$^2$ .................. B05D 3/02; B32B 27/38; B32B 27/00

[52] U.S. Cl. .................. 428/413; 427/385.5; 427/386; 427/388.2; 428/500; 428/907; 260/27 R; 525/4; 525/195

[58] Field of Search ............... 427/385 R, 386, 388 A; 428/907, 413, 500; 260/27 R; 525/4, 195

[56] References Cited

U.S. PATENT DOCUMENTS

| | | | |
|---|---|---|---|
| 3,547,688 | 12/1970 | Gagliardi et al. | 428/907 X |
| 3,575,123 | 4/1971 | Shepherd et al. | 428/907 X |
| 3,817,760 | 6/1974 | Brake | 428/907 X |
| 3,839,052 | 10/1974 | Peterson | 428/907 X |

Primary Examiner—Michael R. Lusignan
Attorney, Agent, or Firm—Stanley A. Marcus; Robert Spector

[57] ABSTRACT

A method for protecting surfaces of objects or constructions that are exposed to surface-water against growth of biological origin by applying an antifouling coating layer onto these surfaces, which coating layer is formed from a paint formulation composing (a) one or more water-insoluble polymeric binders, (b) one or more water-soluble polymeric binders, (c) one or more sparingly water-soluble toxicants, optionally completed with other conventional materials, whereby the proportion of the components (a), (b) and (c) is such that the resulting coating layer when exposed to the surface water, wears off at such a rate that just sufficient toxicant is liberated to prevent fouling of the protected subject.

3 Claims, No Drawings

METHOD FOR PROTECTING SURFACES AGAINST FOULING BY MARINE ORGANISMS

The protection of surfaces of objects or constructions that are exposed to salt or fresh water, such as ships, buoys, bore installations, sluices and the like, against growth of water plants or animals, algae, microorganisms, etc., is of great economical importance.

Certainly in case of ships, where biological growth can lead to a strong increase of the amount of fuel needed to maintain a certain speed or to cover a certain distance, the prevention of fouling over long periods is of still increasing significance. The increase of the costs of the periodical treatment in the dry-dock also makes it highly desirable to attain a protection of the surface during a period which is as long as possible. Many methods have been or are used to attain a protection during a reasonable period of time. The most widely used method is the application onto the surface to be protected of a paint layer containing a toxicant.

In order to be active, the paint has to be formulated in such a way that the toxicant added to it leaches very slowly into the surrounding water. The toxicant should self-evidently be active in very minor concentrations.

Examples of mechanisms by which the speed of leaching of the toxicant out of a paint layer can be regulated, are:

(1) So-called continuous contact paints, whereby such an amount of a toxic pigment, such as cuprous oxide, is added to a seawater-insoluble resin as binder, that the upper layers of the paint after leaching leave a porous matrix of the binder, through which surface-water can migrate to leach the deeper lying toxicant;

(2) Paints or other coating layers that are impregnated by a toxicant that migrates through the organic matrix to the surface;

(3) Coating layers that are formed from special prepared polymers to which the toxicant is chemically bonded, which dissolve slowly into the surrounding water.

Disadvantages of the first two methods are in the first place that it has been proved that the leaching speed of the toxicant from the coating layer is not the same during the full activity period but decreases logarithmically with the exposure time, through which initially there are emitted much too large amounts. Besides that for the first method there are needed high loadings (theoretically 76% by volume of the dry paint) of seawater-soluble pigment, whereas the second method limits the selection possibilities with respect to the toxicant to liquid organic compounds. A disadvantage of the third method is that the polymers concerned have to be prepared specially, which acts costs-increasing, whereas the most effective compounds cannot be used as toxicant.

It has now been found that the above-mentioned disadvantages of the conventional methods for composing and using antifouling coating layers can be removed by having the coating layer formed from a paint formulation consisting of a combination of (a) one or more water-insoluble polymeric binders,
(b) one or more water-soluble polymeric binders, and
(c) one or more sparingly water-soluble solid toxicants, optionally completed with other materials that are conventional in the paint industry, such as metal powders, metal oxides, pigments, wood rosin, plasticizers, viscosity improving agents, solvents and the like, in such a proportion that the coating layer, when exposed to water, wears off slowly or shows a kind of chalking effect, whereby by means of a specific combination of the components (a), (b) and (c) this wearing-off or chalking may be adjusted at such a value that just sufficient toxicant is liberated to prevent fouling of the protected object.

As examples of the above-mentioned ingredients (a), (b) and (c) there may be mentioned, without the intention of restricting the invention thereto:

as water-insoluble binders: polymers or copolymers of acrylonitrile, methacrylonitrile, acrylamide, methacrylamide, vinyl chloride, vinyl acetate, acrylates or methacrylates, styrene, chlorinated rubbers, vinyl-isobutyl ether, vinyltoluene-acrylate copolymers, epoxy- or coaltar epoxy-systems, etc.

as water-soluble binders: polymers or copolymers of vinylpyrrolidone, vinyl alcohol, acrylic acid or methacrylic acid, ethylene oxide, propylene oxide or a polyvinylmethyl ether.

as toxicant: solid organometallic compounds of the formula $(R_1R_2R_3M)_nX$, wherein $R_1$, $R_2$ and $R_3$ represent different or the same alkyl, cycloalkyl, aryl or aralkyl groups, optionally containing one or more substituents, n equals the valency of X, X is an oxygen or sulphur atom or an electronegative group, such as a hydroxy, sulphate, phosphate, phosphite, halide, borate, arsenate, arsenite, antimonate, carboxylate, carbamate or thiocarbamate group, and M is a tin or lead atom, or compounds of other metals. Examples hereof are: tri-n-butyltin fluoride, -sulphate or -acetate, triphenyltin chloride, -hydroxide, -acetate, -sulphate, -phosphate, -fluoride, -carbamates or -thiocarbamates, triphenyllead acetate, cuprous oxide, etc.

As stated hereinbefore, there may further be added other substances to the said combination in order to render the desired properties to the paint, such as dyes, plasticizers, inert solid substances such as talc, mica, metal powders or oxides, natural resins, etc. The paints may be produced by means of appropriate apparatus, such as ball mills, pearl or sand mills, rapid working mixers, etc. It is equally possible to apply the paints directly upon the surface to be protected, or firstly to apply an anti-corrosion layer, whether or not in combination with a barrier or adherence-promoting layer, and thereafter to apply the antifouling layer forming the subject matter of the invention, as the ultimate coating layer. The concentrations of toxicant and the other components used in the paint formulation may be varied very broadly, dependent upon the desired protection period, the layer thickness used, the activity of the toxicant and the properties of the materials and combination used.

The following test procedure was employed to demonstrate the novel effects obtained using the method of this invention.

Thin steel plate was provided with a corrosion preventing layer and thereafter with a, after drying, 100 microns thick layer of a paint formulation according to the invention. Thereafter, on a number of points, accurately determined by means of a stencil, the total thickness of the paint layer was measured with a very accurate layer thickness meter. Subsequently, the plate was fixed onto the outer contour of a cylinder which thereafter was rotated for 95 days in seawater, being refreshed continuously, at a circumference velocity of about 20 seamiles per hour.

During these 95 days the layer thickness of the paint was measured at regular intervals on the points determined by means of the stencil.

The results of these experiments with various paint formulations are stated in the following examples, whereby in example I there have been used formulations outside of the scope of the invention, and in the examples II, III and IV there have been used paint formulations according to the invention.

The compositions indicated in the examples are expressed in terms of % by volume of the solid material.

EXAMPLE I

Three paints according to the composition stated below, whereby the binder consisted of a combination of Vinylite VYHH, a vinyl acetate/vinyl chloride copolymer and a wood rosin, and wherein as toxicant there was used the sparingly soluble solid organotin compound BioMeT 204, were applied in the way as described herein above onto test plates, after which the decrease of the layer thickness after rotation during 95 days in seawater was measured.

| Paint no. | 1 | 2 | 3 |
|---|---|---|---|
| Vinylite VYHH | 25 | 22,5 | 20 |
| rosin W | 16,5 | 19 | 21,5 |
| diphenyl cresyl phosphate | 8,5 | 8,5 | 8,5 |
| BioMeT 204 | 39 | 39 | 39 |
| zinc oxide | 10 | 10 | 10 |
| Bentone 27 | 1 | 1 | 1 |

After this period, no decrease of layer thickness was observed with these three paints.

EXAMPLE II

Three paints corresponding to the series from example I, but whereby the wood rosin and part of the VYHH were replaced by the water-soluble binder polyvinyl pyrrolidone, were tested in the same way.

| Paint no. | 4 | 5 | 6 |
|---|---|---|---|
| Vinylite VYHH | 12,5 | 10 | 7,5 |
| polyvinyl pyrrolidone | 29 | 31,5 | 34 |
| diphenyl cresyl phosphate | 8,5 | 8,5 | 8,5 |
| BioMeT 204 | 39 | 39 | 39 |
| zinc oxide | 10 | 10 | 10 |
| Bentone 27 | 1 | 1 | 1 |
| Decrease of layer thickness (in microns) | 50 | 70 | 90 |

From these tests it can be seen that an important wearing off of the paint layer has taken place, which increases with an increasing polyvinyl pyrrolidone content.

EXAMPLE III

In the paints of example I the wood rosin and part of the Vinylite VYHH were replaced by Lutanol M 40, a polyvinyl methyl ether, as water-soluble binder.

| Paint no. | 7 | 8 | 9 |
|---|---|---|---|
| Vinylite VYHH | 22,5 | 20 | 17,5 |
| Lutanol M 40 | 19 | 21,5 | 24 |
| diphenyl cresyl phosphate | 8,5 | 8,5 | 8,5 |
| BioMeT 204 | 39 | 39 | 39 |
| zinc oxide | 10 | 10 | 10 |
| Bentone 27 | 1 | 1 | 1 |
| Wearing-off (in microns) | 20 | 35 | 45 |

Also here there appears after 95 days of rotation a clear, and by means of the water-soluble resin content controllable, wearing-off effect.

EXAMPLE IV

Of a paint, containing as binder the chlorinated rubber Alloprene 20 and besides that wood rosin, the wood rosin and part of the chlorinated rubber were replaced by Lutanol M 40, after which the paints were tested in the way as described.

| Paint no. | 10 | 11 | 12 | 13 |
|---|---|---|---|---|
| Alloprene R 10 | 25 | 12,5 | 10 | 7,5 |
| rosin WW | 20 | — | — | — |
| Lutanol M 40 | — | 32,5 | 35 | 37,5 |
| diphenyl cresyl phosphate | 8,5 | 8,5 | 8,5 | 8,5 |
| BioMeT 204 | 30 | 30 | 30 | 30 |
| zinc oxide | 15,7 | 15,7 | 15,7 | 15,7 |
| Bentone 34 | 0,8 | 0,8 | 0,8 | 0,8 |
| Wearing off (in microns) | 0 | 10 | 15 | 20 |

After 95 days of rotation there appears also to have taken place a clear, by means of the Lutanol content controllable, wearing-off.

I claim:

1. A method for protecting the surfaces of objects and constructions that are exposed to salt or fresh water against growths of biological origin by applying an antifouling outer coating layer onto these surfaces, characterized in, that the coating layer is formed from a paint formulation consisting essentially of a combination of
   (a) at least one water-insoluble polymeric binder selected from the group consisting of homopolymers and copolymers of acrylonitrile, methacrylonitrile, acrylamide, methacrylamide, vinyl acetate, vinyl chloride, esters of acrylic and methacrylic acids, styrene, vinyl-isobutyl ether, epoxy and coaltar-epoxy polymers and chlorinated rubbers;
   (b) at least one water-soluble polymeric binder selected from the group consisting of polymers and copolymers of vinylpyrrolidone, vinyl alcohol, ethylene oxide, propylene oxide and vinylmethyl ether; wherein said water-soluble polymeric binder constitutes from 46 to 83% of the combined weights of said water-soluble and water-insoluble polymeric binders;
   (c) at least one solid toxicant of the formula $(R_1R_2R_3M)_nX$ wherein $R_1$, $R_2$ and $R_3$ are individually selected from the group consisting of alkyl, cycloalkyl, aryl and alkaryl groups that optionally contain at least one substituent, n represents the valence of X, X is selected from the group consisting of oxygen, sulfur, hydroxyl, sulfate, phosphate, phosphite, halide, borate, arsenate, arsenite, antimonate, carboxylate, carbamate and thiocarbamate and M is tin or lead; and
   (d) at least one conventional paint additive selected from the group consisting of metal powders, metal oxides, pigments, wood rosin, plasticizers and viscosity improving agents.

2. Method according to claim 1, characterized in, that the organo-metallic compound is tri-n-butyltin fluoride.

3. Method according to claim 1, characterized in, that the organo-metallic compound is triphenyltin fluoride.

* * * * *